(12) United States Patent
Juranitch

(10) Patent No.: US 12,196,111 B2
(45) Date of Patent: *Jan. 14, 2025

(54) COST EFFECTIVE PLASMA COMBINED HEAT AND POWER SYSTEM

(71) Applicant: Heat IP Holdco, LLC., Aberdeen (GB)

(72) Inventor: James Charles Juranitch, Fort Lauderdale, FL (US)

(73) Assignee: HEAT IP HOLDCO, LLC, Aberdeen (GB)

( * ) Notice: Subject to any disclaimer, the term of this patent is extended or adjusted under 35 U.S.C. 154(b) by 34 days.

This patent is subject to a terminal disclaimer.

(21) Appl. No.: 16/746,584

(22) Filed: Jan. 17, 2020

(65) Prior Publication Data

US 2020/0291823 A1  Sep. 17, 2020

Related U.S. Application Data

(63) Continuation of application No. 13/832,252, filed on Mar. 15, 2013, now Pat. No. 10,539,043, which is a
(Continued)

(51) Int. Cl.
*F01K 13/00* (2006.01)
*C01B 3/02* (2006.01)
(Continued)

(52) U.S. Cl.
CPC .............. *F01K 13/006* (2013.01); *C01B 3/02* (2013.01); *C01B 3/342* (2013.01); *C01B 3/348* (2013.01);
(Continued)

(58) Field of Classification Search
CPC . F01K 13/006; F01K 7/16; C01B 3/02; C01B 3/342; C01B 3/348;
(Continued)

(56) References Cited

U.S. PATENT DOCUMENTS 4,514,219 A    4/1985  de Saint Martin
6,175,183 B1 *  1/2001  Liehr ................. H01J 37/32192
                                                    313/231.31
(Continued)

FOREIGN PATENT DOCUMENTS

WO      2008104088 A1   9/2008
WO   WO-2008104088 A9 *  1/2009 .............. F23G 5/38

*Primary Examiner* — Wayne A Langel
*Assistant Examiner* — Syed T Iqbal
(74) *Attorney, Agent, or Firm* — LAW OFFICE OF JESSE D. LAMBERT, LLC

(57) ABSTRACT

A method of generating syngas as a primary product from renewable feedstock, fossil fuels, or hazardous waste with the use of a cupola. The cupola operates on inductive heat alone, chemically assisted heat, or plasma assisted heat. Cupola operation is augmented by employing carbon or graphite rods to carry electrical current into the metal bath that is influenced by the inductive element. The method includes the steps of providing a cupola for containing a metal bath; and operating an inductive element to react with the metal bath. A combination of fossil fuel, a hazardous waste, and a hazardous material is supplied to the cupola. A plasma torch operates on the metal bath directly, indirectly, or in a downdraft arrangement. Steam, air, oxygen enriched air, or oxygen are supplied to the metal bath. A pregassifier increases efficiency and a duct fired burner is added to a simple cycle turbine with fossil fuel augmentation.

26 Claims, 5 Drawing Sheets

Related U.S. Application Data continuation-in-part of application No. PCT/US2012/024726, filed on Feb. 10, 2012.

(60) Provisional application No. 61/526,248, filed on Aug. 22, 2011, provisional application No. 61/525,708, filed on Aug. 19, 2011, provisional application No. 61/463,022, filed on Feb. 10, 2011.

(51) Int. Cl.
| | |
|---|---|
| *C01B 3/34* | (2006.01) |
| *C10J 3/57* | (2006.01) |
| *C21B 13/00* | (2006.01) |
| *F01K 7/16* | (2006.01) |
| *F23G 5/027* | (2006.01) |
| *F23G 5/08* | (2006.01) |

(52) U.S. Cl.
CPC .................. *C10J 3/57* (2013.01); *F01K 7/16* (2013.01); *F23G 5/027* (2013.01); *F23G 5/085* (2013.01); *C01B 2203/0216* (2013.01); *C01B 2203/0255* (2013.01); *C01B 2203/0861* (2013.01); *C10J 2300/0946* (2013.01); *C10J 2300/0956* (2013.01); *C10J 2300/0959* (2013.01); *C10J 2300/0976* (2013.01); *C10J 2300/1238* (2013.01); *C10J 2300/1276* (2013.01); *C10J 2300/1675* (2013.01); *C21B 13/0073* (2013.01); *F23G 2202/20* (2013.01); *F23G 2204/201* (2013.01); *F23G 2204/204* (2013.01); *Y02E 20/12* (2013.01); *Y02E 20/34* (2013.01); *Y02P 10/32* (2015.11); *Y02P 20/129* (2015.11)

(58) Field of Classification Search
CPC .... C01B 2203/0216; C01B 2203/0255; C01B 2203/0861; C10J 3/57; C10J 2300/0946; C10J 2300/0956; C10J 2300/0959; C10J 2300/0976; C10J 2300/1238; C10J 2300/1276; C10J 2300/1675; F23G 5/027; F23G 5/085; F23G 2202/20; F23G 2204/201; F23G 2204/204; C21B 13/0073; Y02E 20/12; Y02E 20/34; Y02E 20/18; Y02P 10/32; Y02P 20/129
See application file for complete search history.

(56) References Cited

U.S. PATENT DOCUMENTS

| | | |
|---|---|---|
| 6,372,156 B1 | 4/2002 | Kong et al. |
| 2009/0133407 A1 | 5/2009 | Sawyer |
| 2011/0315096 A1* | 12/2011 | Wilson .................. F01K 23/067 123/3 |

* cited by examiner

COST EFFECTIVE PLASMA COMBINED HEAT AND POWER SYSTEM

RELATIONSHIP TO OTHER APPLICATIONS

This application is a continuation of U.S. application Ser. No. 13/832,252, filed on 15 Mar. 2013 (the '252 application), now U.S. Pat. No. 10,539,043, which is a continuation-in-part of international application no. PCT/US2012/024726, filed on 10 Feb. 2012 (the '726 application), which claims the benefit of U.S. application No. 61/526,248, filed on 22 Aug. 2011 (the '248 application), U.S. application No. 61/463,022 filed on 10 Feb. 2011 (the '022 application), and U.S. application No. 61/525,708 filed on 19 Aug. 2011 (the '708 application). The '252 application, the '726 application, the '248 application, the '022 application, and the '708 application are all hereby incorporated by reference in their entirety as though fully set forth herein.

BACKGROUND OF THE INVENTION

Field of the Invention

This invention relates generally to systems for generating heat and power, and more particularly, to an inductive and plasma based system that generates Combined Heat and Power using multiple back up modes of operation.

Description of the Related Art

Combined Heat and Power (hereinafter, "CHP") systems, as well as plasma based systems, are known. Although these two types of known systems have been combined in simple arrangements, such as internal combustion based systems, there is a need for a system that achieves the benefits and advantages of both such technologies.

It is, therefore, an object of this invention to provide a system that achieves the benefits of Combined Heat and Power systems, and plasma based systems.

It is another object of this invention to provide a cost-effective, commercially viable, renewable CHP system.

SUMMARY OF THE INVENTION

The foregoing and other objects are achieved by this invention which provides, a method of producing CHP, the method including the steps of:
  providing a cupola for containing a plasma source;
  providing an inductive element;
  providing a metal bath in the cupola; and
  delivering a feedstock to the cupola.

In accordance with a specific illustrative embodiment of the invention, the feedstock is a fossil fuel. In other embodiments, the feedstock is a hazardous waste, and in still further embodiments, the feedstock is a combination of any organic compound, fossil fuel, or hazardous material.

In one embodiment, there is further provided the step of operating the inductive element to react with the metal bath to generate syngas. Additionally, there is provided the step of supplementing the step of operating an inductive element by the further step of operating a plasma torch. A plasma torch is operated on the metal bath, in one embodiment, selectably directly and indirectly. In some embodiments, the step of operating a plasma torch is performed in a downdraft arrangement, and in yet further embodiments, the step of operating a plasma torch is performed at an angle other than vertical.

There is provided the further step of supplementing the step of operating an inductive element by performing the further step of injecting steam to enhance the production of syngas. The step of operating an inductive element is supplemented by performing the further step of injecting a selectable one of air, oxygen enriched air, and oxygen. In a further embodiment, there is provided the further step of supplementing the step of operating an inductive element by performing the further step of conducting electrical energy via a conductive rod formed of a selectable one of graphite and carbon into the metal bath.

In accordance with a further method aspect of the invention, there is provided a method of producing CHP, the method including the steps of:
  providing a cupola for containing a metal bath; and
  operating an inductive element to react with the metal bath to generate syngas.

In one embodiment of this further method aspect there is provided the step of providing the syngas to a duct fired burner, which may also be termed an "afterburner," to produce steam. In some embodiments of the invention, the step of providing the syngas to a duct fired burner to produce steam includes the further step of providing natural gas to the duct fired burner. In some such embodiments, the mix of syngas to natural gas delivered to the duct fired burner or simple cycle turbine ranges between 0% to 100%.

In an advantageous embodiment, there is provided the step of generating steam from the duct fired burner, and there is provided the further step of generating steam from a heat recovery system, the steam from the duct fired burner and the heat recovery system being provided to a steam turbine to make electricity.

In yet another embodiment of the invention, the mix of syngas to fossil fuel delivered to the duct fired burner or simple cycle turbine ranges between 0% to 100%.

In a still further method aspect of the invention, there is provided a method of producing CHP, the method including the steps of:
  providing a cupola for containing a metal bath;
  operating an inductive element to react with the metal bath; and
  supplementing the step of operating an inductive element by the further step of operating a plasma torch and a pregassifier.

In yet another aspect of the invention, there is provided a method of producing CHP, the method including the steps of:
  providing a cupola for containing a metal bath;
  operating an inductive element to react with the metal bath; and
  supplementing the step of operating an inductive element by the further step of propagating a selectable one of plasma and electricity into the metal bath to supplement heating of the cupola by the step of operating an inductive element with a pregassifier and a turbine generator and a heat recovery system (hereinafter, "HRS").

In a still further method aspect of the invention, there is provided a method of producing CHP, the method including the steps of:
  providing a cupola for containing a metal bath;
  operating an inductive element to react with the metal bath; and
  supplementing the step of operating an inductive element by the further step of propagating a selectable one of plasma and electricity into the metal bath to supplement heating of the cupola by the step of operating an inductive element with a pregassifier and a turbine generator which is augmented with a duct fired burner before the HRS.

In a further embodiment the duct fired burner may be run on 100% syngas or a blend of a fossil fuel and syngas that could range to 100% fossil fuel. The turbine may be run on 100% syngas or a blend of fossil fuel that may range to 100% fossil fuel. The steam generated by the duct fired burner and HRS is, in some embodiments, sold as thermal power or used to power a second steam turbine in a conventional duct fired burner augmented combined cycle generation system.

In one embodiment, there is provided the further step of supplementing the step of operating an inductive element by performing the further step of conducting electrical energy via a conductive rod formed of a selectable one of graphite and carbon into the metal bath.

In a further embodiment, the pregassifier has multiple stages. The first stage of the gassifier is heated by steam and the second stage is heated by higher temperature steam, air, molten salt, or any other high temperature heat transfer medium.

In accordance with a method aspect of the invention, there is provided a method of producing combined heat and power with the use of inductive furnace technology, and optionally with plasma assisted heat with direct, or indirect applications of energy. Additionally, the method of the present invention optionally employs downdraft assisted plasma energy. In accordance with a specific illustrative embodiment, the method of the present invention produces heat via an inductive heating element by exciting and heating a metal bath in a cupola. The metal bath is used, in some embodiments, to produce syngas alone as a heat source or it is supplemented by a plasma torch system. In some embodiments, the cupola is used to process renewable feedstocks, fossil fuels, or hazardous materials. The heat required to produce syngas is, in some embodiments, supplemented by injection of air, oxygen enriched air, or oxygen into the cupola. The syngas process is also supplemented, in some embodiments, by the injection of steam to the cupola.

The system is configured in a novel way to yield extremely high overall efficiency. A combination of common production components and a high efficiency system design are incorporated in a novel way to achieve the goal of a low cost CHP system. The feedstock to run the operation in some embodiments, is a renewable fuel such as Municipal Solid Waste (hereinafter, "MSW"), biomass, algae, or fossil fuels.

The invention utilizes the high temperature syngas produced by the inductive plasma process with a simple cycle turbine operating at its maximum fuel inlet temperature. A duct fired burner is located at the outlet of the turbine and before a HRS. The fuel for the duct fired burner is delivered to the system at the maximum allowable temperature. The high velocities, elevated temperatures, available oxygen, and mixing characteristics at the turbine outlet before the duct fired burner promote high efficiency in the duct fired burner and exceptionally high efficiency in the HRS for steam production. The overall system efficiency in some embodiments of the invention is over twice that of conventional coal steam generators in use today.

In a further embodiment the duct fired burner may be run on 100% syngas or a blend of a fossil fuel and syngas that could range to 100% fossil fuel. The turbine may be run on 100% syngas or a blend of fossil fuel that may range to 100% fossil fuel. The steam generated by the duct fired burner and HRS may be sold as thermal power or may be used to power a second steam turbine in a conventional duct fired burner augmented combined cycle generation system.

The novel addition of natural gas in the system also allows for redundancy and scalability in the system. The steam output is tripled in many cases by the additional injection of natural gas or other fossil fuels to the duct fired burner. In some embodiments of the invention the turbine has its syngas-derived fuel sweetened with the natural gas, if necessary. Finally an advantageous use of pregassifiers is utilized in the system to boost the overall plant efficiency and attain the goal of a cost effective production facility.

The inventive system also incorporates the use of inductive baths with direct acting, indirect acting, and down draft, plasma assist. Additionally, the system of the present invention incorporates a duct fired burner application on the outlet of the simple cycle turbine to improve system efficiency. The steam generated by the duct fired burner and HRS may be sold as thermal power or may be used to power a second steam turbine in a conventional duct fired burner augmented combined cycle generation system.

In accordance with yet a further aspect of the invention, there is provided a method of producing combined heat and power, the method including the steps of:

providing a cupola for containing a metal bath;

operating an inductive element to react with the metal bath to generate syngas; and providing the syngas to a duct fired burner to produce steam.

In one embodiment of this yet further method aspect, the step of providing the syngas to a duct fired burner to produce steam includes the further step of providing natural gas to the duct fired burner.

In some embodiments, the steam that is generated from the duct fired burner and the FIRS are utilized by a steam turbine to make electricity.

The mix of syngas to fossil fuel that is delivered to the duct fired burner or to the simple cycle turbine ranges between 0% to 100%. In other embodiments, the mix of syngas to natural gas delivered to the duct fired burner or simple cycle turbine ranges between 0% to 100%.

BRIEF DESCRIPTION OF THE DRAWING

Comprehension of the invention is facilitated by reading the following detailed description, in conjunction with the annexed drawing, in which.

DETAILED DESCRIPTION

Figure 1:
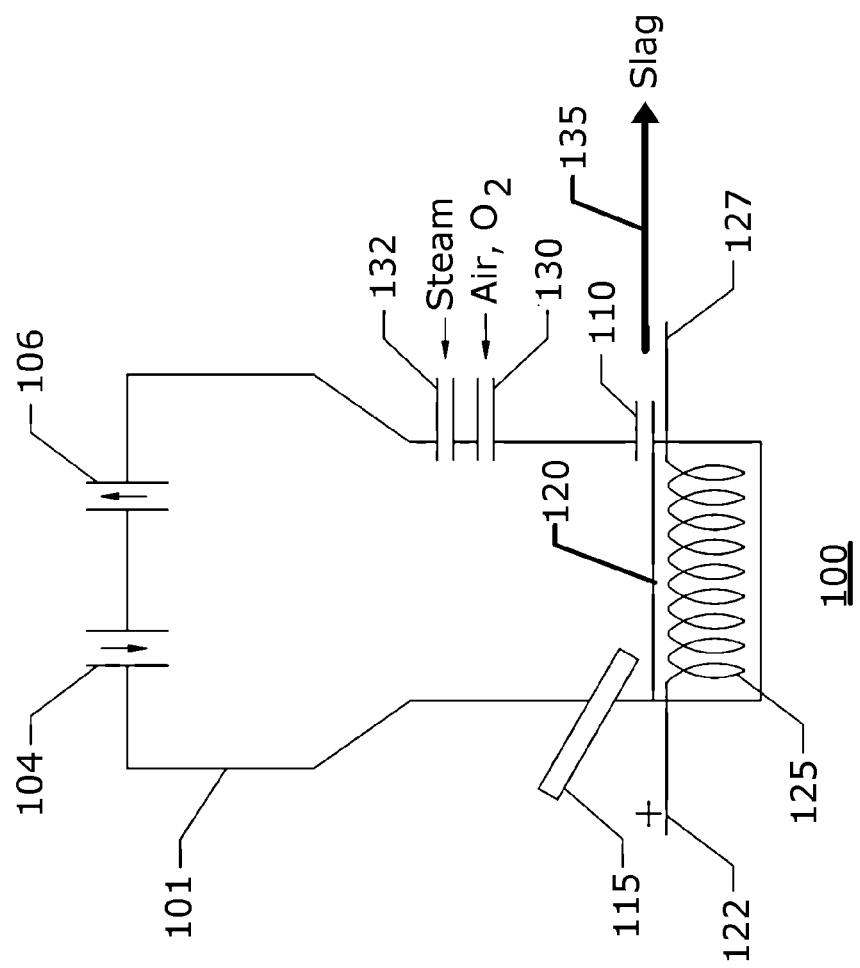
FIG. 1 is a simplified schematic representation of a cupola arrangement constructed in accordance with the invention.

FIG. 1 is a simplified schematic representation of a cupola arrangement 100 constructed in accordance with the invention. As shown in this figure, a cupola shell 101 is provided with an inlet 104 for introducing a feedstock (not shown)

that in some embodiments of the invention is a renewable feedstock, a fossil fuel, or a hazardous waste (not shown). Any combination of the three forms of feedstock can be used in the practice of the invention. There is additionally provided in an outlet port 106 for enabling removal of the generated syngas (not shown). In contrast to conventional inductive furnaces that facilitate a large outlet for metal or alloy production, there is no other outlet for such product. There is an additional small drain 110 for eliminating inorganic slag.

It is a feature of the present invention that primarily organic compounds are processed to produce syngas. The specific illustrative embodiment of the invention described herein is essentially a bucket arrangement wherein an indirect electrical arc services a non-transfer inductive furnace. This is distinguishable from the conventional use of an inductive furnace, which is to make metals and alloys.

Figure 3:
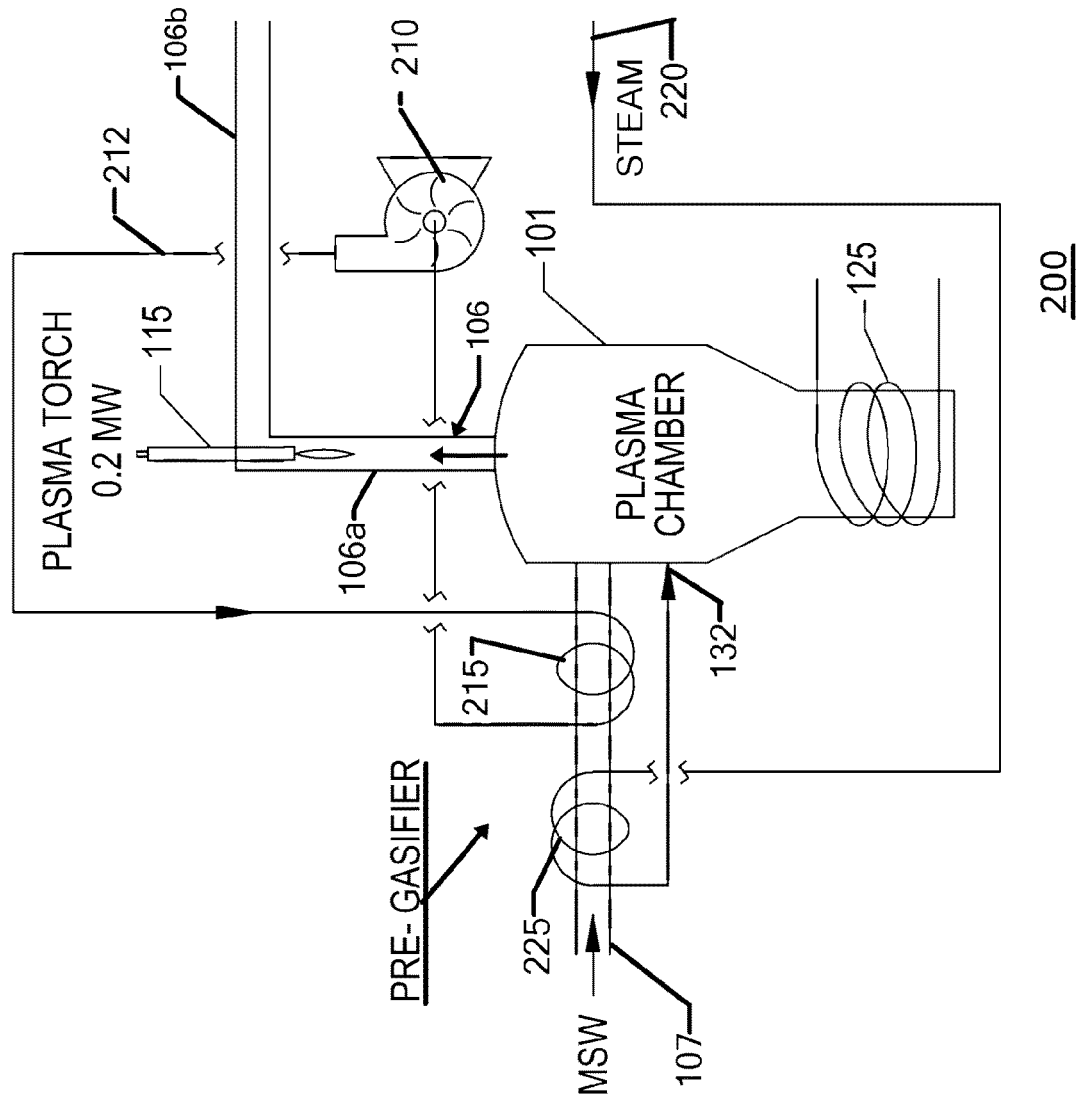
FIG. 3 is a simplified schematic representation showing an indirect application of a plasma torch on an inductive metal bath and the cupola.
Figure 4:
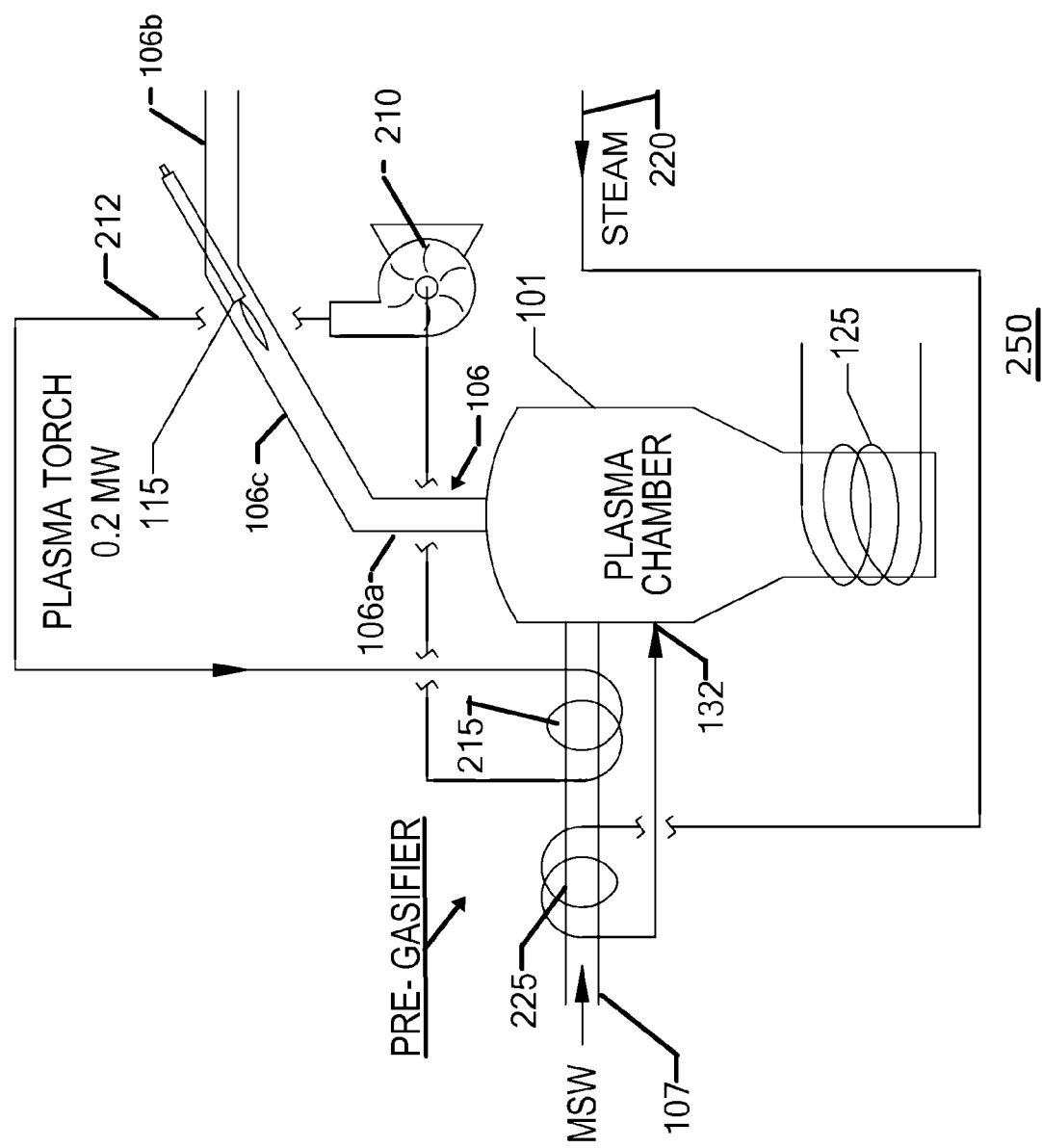
FIG. 4 is a simplified schematic representation showing a second indirect application of a plasma torch disposed at an angle relative to the cupola.

FIG. 1 further shows cupola arrangement 100 to have a direct acting plasma torch 115, which in some embodiments of the invention, as will be described below in relation to FIGS. 3, and 4, is an indirect acting plasma torch, to assist in the cupola heating process. In other embodiments, plasma torch 115 is a carbon or graphite rod that is used to conduct AC or DC electrical energy into a metal bath 120. The return path for the electrical energy has been omitted from this figure for the sake of clarity.

There is provided in this specific illustrative embodiment of the invention a cathode 122 that is coupled electrically to an inductive element 125. Additionally, inductive element 125 has associated therewith an anode 127.

Air, oxygen enriched air, or oxygen are injected into cupola arrangement 100 via an inlet 130 to assist in the generation of heat using chemical energy and steam that is delivered via an inlet 132. The chemical energy and steam are injected for the further purpose of assisting in the generation of syngas. The process of the present invention can, in some embodiments, be performed in a pyrolysis, or air starved, mode of operation.

Figure 2:
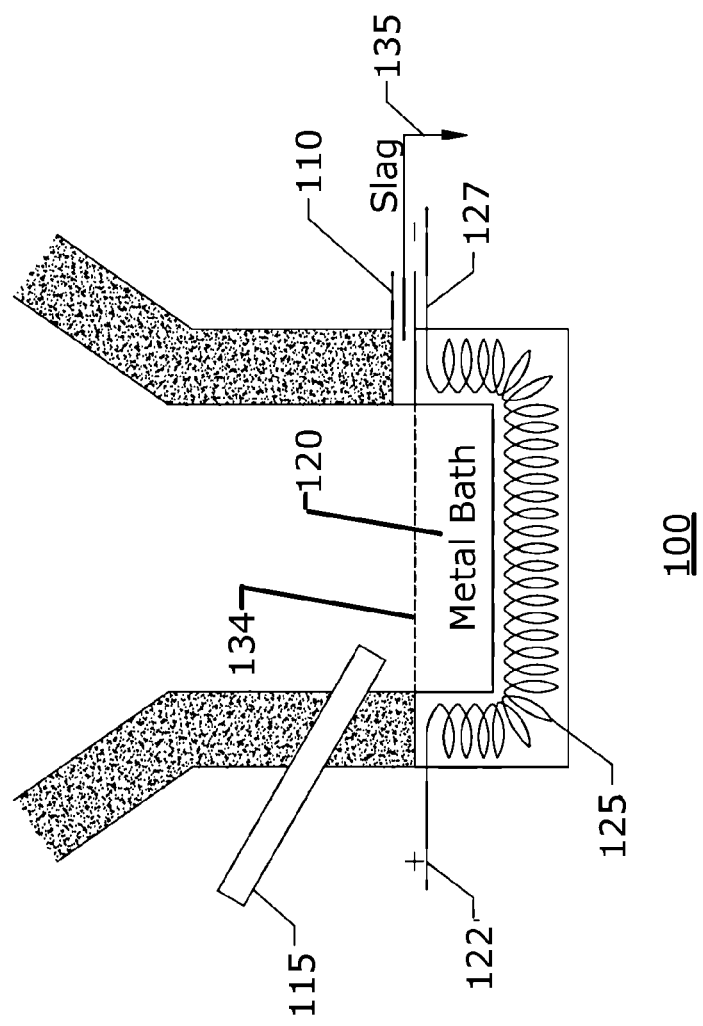
FIG. 2 is a simplified schematic representation showing in greater detail a lower portion of the cupola of FIG. 1.

FIG. 2 is a simplified schematic representation showing in greater detail a lower portion of cupola arrangement 100 of FIG. 1. Elements of structure that have previously been discussed are similarly designated. Inductive element 125 reacts on metal bath 120. Metal bath 120 can consist of any metal or alloy such as aluminum for low temperature work or titanium for high temperature work. Metal bath 120 is kept at a constant fill level 134 by operation of slag drain 110 through which a slag product 135 is drained.

FIG. 3 is a simplified schematic representation showing a cupola arrangement 200, wherein there is illustrated an indirect application of a plasma torch 115 on an inductive metal bath and the cupola for enhancing the heating process. In this specific illustrative embodiment of the invention, plasma torch 115 has a power capacity of 0.2 MW. Elements of structure that have previously been discussed are similarly designated. As shown in this figure, syngas outlet 106 is lengthened in this specific illustrative embodiment of the invention, and is shown to have vertical and horizontal portions, 106a and 106b, respectively. Indirectly acting plasma torch 115 is, in this embodiment, inserted in the end of vertical section 106a. In this specific illustrative embodiment of the invention, syngas outlet 106 is refractory-lined and insulated (not shown).

In the embodiment of FIG. 3, there is shown an inlet 107 via which is provided municipal solid waste (MSW) (not specifically designated) as a feedstock. Of course, other types of feedstock, as hereinabove noted, can be used in the practice of the invention.

The product syngas in this embodiment is forced to exit into vertical section 106a where it communicates with the high temperature plume (not specifically designated) and the radiant heat that is issued by plasma torch 115. The syngas and syngas outlet 106 both are heated by operation of plasma torch 115. In this specific illustrative embodiment of the invention, the heated horizontal portion 106b of syngas outlet 106 is subjected to a heat extraction arrangement that delivers the heat to inlet 107 for the purpose of pre-gasifying the MSW feedstock. The heat extraction arrangement is formed by an impeller 210 that urges a fluid (not shown) along a fluid loop that includes a region 212 where the fluid is heated by communication with heated horizontal portion 106b of syngas outlet 106. The heated fluid then is propagated to a heat exchanger 215 where a portion of the heat therein is transferred to the incoming MSW feedstock that is being delivered at inlet 107.

There is additionally shown in this figure a steam inlet 132, as hereinabove described. However, the steam is shown in this figure to be supplied by a steam supply 220, and the steam then is conducted to a further heat exchanger 225 where a portion of the heat in the steam is transferred to the incoming MSW feedstock that is being delivered at inlet 107. Heat exchangers 215 and 225 thereby constitute a pre-gassifier for the MSW feedstock, whereby the production of syngas is enhanced FIG. 4 is a simplified schematic representation of a cupola arrangement 250 showing a second indirect application of a plasma torch that is disposed at an angle relative to the cupola. Elements of structure that have previously been discussed are similarly designated. As shown in this figure, the outlet port 106 is fabricated in part at an angle that in some embodiments is greater than 90° to induce tumbling and mixing in the product syngas (not shown). Thus, in addition to vertical and horizontal portions, 106a and 106b, respectively, there is shown in this specific illustrative embodiment of the invention an angular portion 106c. Plasma torch 115 is shown to be inserted in angular portion 106c.

Figure 5:
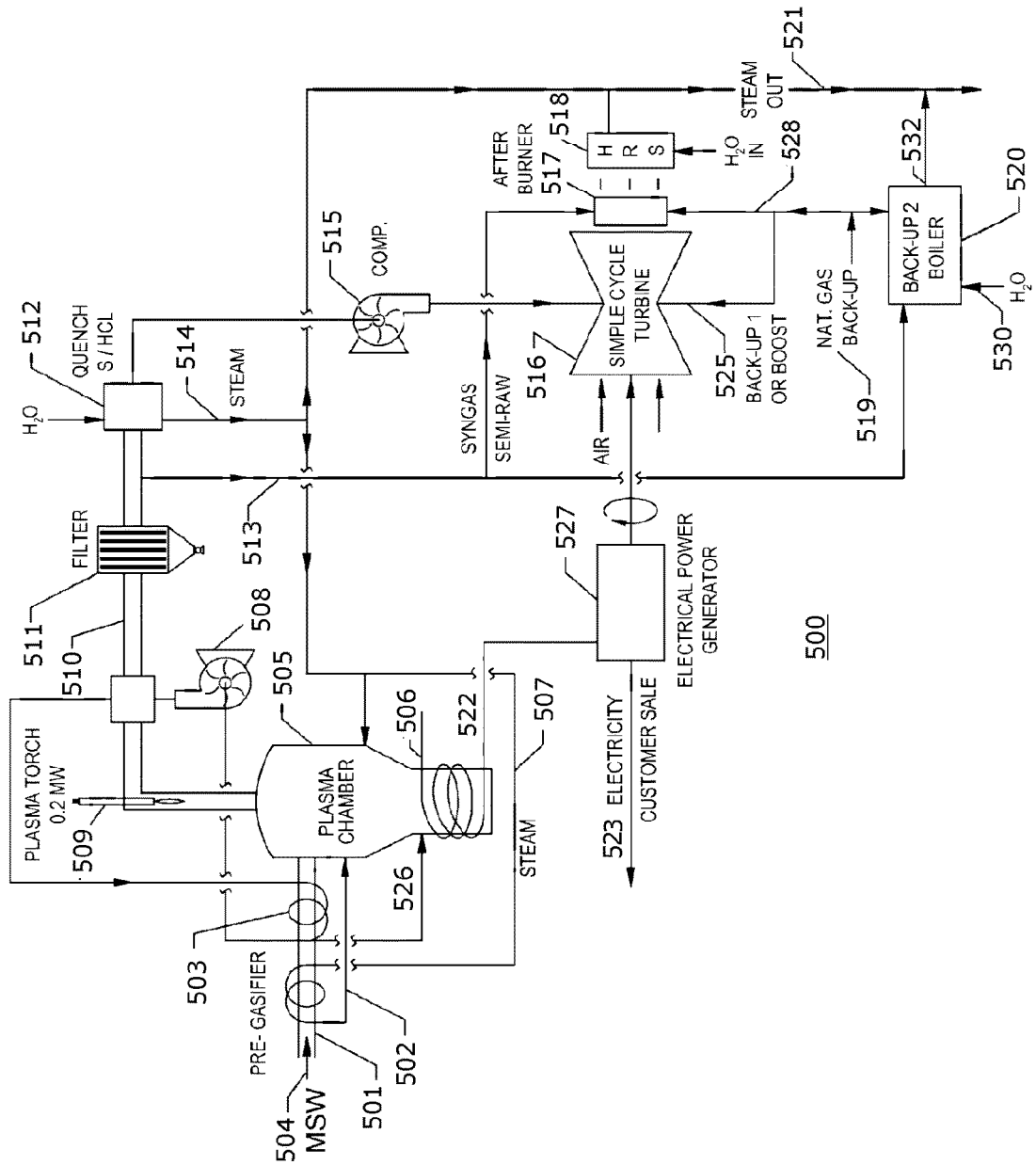
FIG. 5 is a simplified schematic representation of a specific illustrative embodiment of a system configured in accordance with the principles of the invention for producing combined heat and power.

FIG. 5 is a simplified schematic representation of a specific illustrative embodiment of a system 500 configured in accordance with the principles of the invention for producing combined heat and power. As shown in this figure, a main feed tube 501 serves as an input for feedstock, in the form of Municipal Solid Waste 504 ("MSW") for fueling the system. Feed tube 501 is preheated in a novel way to increase efficiency with a heat transfer system 502 that is, in the embodiment, operating on waste low pressure steam heat generated from sensible heat that is recovered from the inductive/plasma process taking place in a plasma/inductive chamber 505.

In this embodiment, sensible heat is recovered using a syngas quench system 512 that serves to generate waste heat steam 514. This steam, which is delivered to the pregassifier along steam conduit 507, is typically below 400° F. A second stage of pregassifier energy is provided to the feedstock to improve system efficiency, at a higher temperature at pregassifier loop 503. Pregassifier loop 503 extracts heat from syngas 510 by operation of an impeller, such as compressor 508, which urges a flow of heated fluid (not specifically designated) through the loop. At least a portion of the heated fluid, in this specific illustrative embodiment of the invention, is delivered to plasma/inductive chamber 505 at an input 526. Plasma/inductive chamber 505 incorporates, in some embodiments, a cupola arrangement (not specifically designated in this figure), as described above.

This added energy serves to improve overall performance by the use of waste heat recovered from sensible energy on the outlet of the plasma/inductive chamber 505. In this case the transfer media is typically air or extreme high temperature steam. More exotic heat transfer media like molten salt are used in some embodiments. It is to be understood that the system of the present invention is not limited to two stages of pregassification heat process and transfer, as multiple such gassifier systems are used in the practice of some embodiments, of the invention.

As noted, MSW 504 is used as a feedstock in this process example. Inductive coil 506 and plasma torch 509 are the primary energy sources or inputs that react with MSW 504 to produce Syngas 510. Inductive coil 506 reacts against a molten metal bath (not shown) in plasma/inductive chamber 505.

A filter 511 and quench system 512 are portions of the emission reduction system. Sorbents (not shown) are injected and used in some embodiments, but have been omitted in this figure for sake of clarity of the drawing. The semi-processed syngas 510 is split out through conduit 513 and fed directly into a duct fired burner 517 at the highest temperature available. The balance of the syngas is fed into a compressor 515 and boosted in pressure to be fed into turbine 516. Fossil fuel such as natural gas from pipe 523 and 525 may be mixed with the syngas in concentrations from 0 to 100%. Other fossil fuels such as, but not limited to, butane, propane, or diesel may also be used. Air (not specifically designated) enters turbine 516, and the high temperature, high velocity, and turbulent air at the outlet (not specifically designated) of turbine 516 is boosted to a higher energy state through the added energy of duct fired burner 517. A heat recovery system ("HRS") 518 is shown to be in direct communication with the energy-rich outlet gas from the turbine and produces steam 521, which is sold to customers or could be routed to a low turbine (not shown) to produce electricity in a combined cycle configuration (not shown).

Electrical power 528 is generated at electrical generator 527, which as shown, receives rotatory mechanical power in this embodiment from turbine 516. As noted electrical energy may also be generated from an additional steam turbine driven off of steam pipe 521. Electrical output power 522 from the electrical generator is used to run the process in plasma chamber 505. Also, electrical output power 528 or the steam turbine generated electrical power driven off of pipe 521 is available for sale to a third party. Natural gas or other fossil fuel gas is boosted into turbine 516 at input 525 to enhance performance and reliability. Natural gas or other fossil fuel energy is boosted into input 523 of duct fired burner 517. This too enhances overall system performance and reliability.

This process of the present invention also serves as a system backup if the production of syngas 510 is for any reason stopped or reduced. A second back up boiler 520 functions as a redundant steam generator to expand the production range of the facility and to add another level of redundancy to the steam production. As shown, back-up boiler 520 receives water in this embodiment at an input 530 and issues steam at an output 532. Back-up boiler 520 is, in some embodiments, operated on syngas, fossil fuel, or a combination of both. In addition, a natural gas source 519 is shown to supply back-up boiler 520 and also serves as a boost to turbine 516 at an input 525.

Although the invention has been described in terms of specific embodiments and applications, persons skilled in the art can, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A method of producing combined heat and power, the method comprising the steps of:
    providing a cupola for containing a heat source, wherein the cupola comprises a feedstock inlet and a chamber and a syngas outlet;
    providing a metal bath in the cupola; and
    heating the metal bath to a molten state within the cupola with an inductive element;
    delivering a feedstock to the cupola through the feedstock inlet which falls on the metal bath after passing into the chamber;
    generating syngas from the feedstock, wherein the syngas is produced by providing the feedstock on top of the metal bath;
    heating the syngas exiting via the syngas outlet;
    providing the syngas to a duct fired burner to produce steam; and
    generating power from the syngas.

2. The method of claim 1, wherein the feedstock comprises a fossil fuel.

3. The method of claim 1, wherein the feedstock comprises a hazardous waste.

4. The method of claim 1, further comprising heating the syngas with a plasma torch after the syngas enters the syngas outlet.

5. The method of claim 1, wherein there is further provided the step of operating the inductive element to react with the metal bath to generate the syngas.

6. The method of claim 4, wherein there is further provided the step of supplementing said step of operating an inductive element by the further step of operating a second plasma torch.

7. The method of claim 6, wherein said step of operating a second plasma torch is performed to operate on the metal bath selectably directly and indirectly.

8. The method of claim 7, wherein said step of operating a second plasma torch is performed in a downdraft arrangement.

9. The method of claim 5, wherein there is provided the further step of supplementing said step of operating an inductive element by performing the further step of injecting steam to enhance the production of syngas.

10. The method of claim 1, wherein there is further provided the step of operating at least one cupola plasma torch within the cupola.

11. The method of claim 1, wherein said step of providing the syngas to a duct fired burner to produce steam includes the further step of providing natural gas to the duct fired burner.

12. The method of claim 1, wherein there is provided the step of generating steam from the duct fired burner, and there is provided the further step of generating steam from a heat recovery system, the steam from the duct fired burner and the heat recovery system being provided to a steam turbine to make electricity.

13. The method of claim 1, further providing a fossil fuel to the duct fired burner, where the mix of syngas to fossil fuel delivered to the duct fired burner or simple cycle turbine ranges between 0% to 100%.

14. The method of claim 5, wherein there is provided the further step of supplementing said step of operating an inductive element by performing the further step of injecting a selectable one of air and oxygen.

15. The method of claim 5, wherein there is provided the further step of supplementing said step of operating an inductive element by performing the further step of conducting electrical energy via a conductive rod formed of a selectable one of graphite and carbon into the metal bath.

16. The method of claim 1, further comprising heating the syngas as the syngas enters the syngas outlet.

17. A method of producing combined heat and power, the method comprising the steps of:
   providing a cupola comprising a feedstock inlet, a chamber, a syngas outlet, and a metal bath, wherein the metal bath is disposed beneath the chamber;
   delivering a feedstock to the cupola through the feedstock inlet which falls on the metal bath after passing into the chamber;
   operating an inductive element to react with the metal bath to generate syngas from the feedstock, wherein the feedstock is delivered directly on top of the metal bath to generate the syngas;
   heating the syngas that exits via the syngas outlet;
   providing the syngas to a duct fired burner to produce steam; and
   generating power from the syngas.

18. The method of claim 17, wherein there is further provided the step of supplementing said step of operating an inductive element by the further step of operating at least one cupola plasma torch within the cupola.

19. The method of claim 17, wherein there is provided the further step of heating the syngas with a plasma torch after the syngas enters the syngas outlet.

20. The method of claim 17, further comprising heating the syngas as the syngas exits the cupola.

21. A method of producing combined heat and power, the method comprising the steps of:
   providing a cupola for containing a heat source, wherein the cupola comprises a feedstock inlet and a chamber and a syngas outlet;
   providing a metal bath in the cupola and heating the metal bath to a molten state within the cupola;
   delivering a feedstock to the cupola through the feedstock inlet so that the feedstock falls onto the metal bath after passing into the chamber, whereby syngas is generated from the feedstock on the metal bath, and the syngas exits the chamber by passing into the syngas outlet;
   heating the syngas that exits via the syngas outlet;
   heating the syngas with a plasma torch; and
   generating power from the syngas.

22. The method of claim 21, further comprising the step of providing the syngas to a duct fired burner to produce steam.

23. A method of producing combined heat and power, the method comprising the steps of:
   providing a cupola for containing a heat source, wherein the cupola comprises a feedstock inlet and an open chamber;
   providing a metal bath in the cupola and heating the metal bath to a molten state within the cupola with an inductive element;
   delivering a feedstock to the cupola through the feedstock inlet which falls on the metal bath after passing through the open chamber;
   generating syngas from the feedstock, wherein the syngas is produced by providing the feedstock on top of the metal bath;
   heating the syngas with a plasma torch after the syngas enters a syngas outlet;
   providing the syngas to a duct fired burner to produce steam; and
   generating power from the syngas.

24. A method of producing combined heat and power, the method comprising the steps of:
   providing a cupola for containing a heat source, wherein the cupola comprises a feedstock inlet and an open chamber;
   providing a metal bath in the cupola and heating the metal bath to a molten state within the cupola with an inductive element;
   delivering a feedstock to the cupola through the feedstock inlet which falls on the metal bath after passing through the open chamber;
   generating syngas from the feedstock, wherein the syngas is produced by providing the feedstock on top of the metal bath;
   heating the syngas as the syngas enters a syngas outlet;
   providing the syngas to a duct fired burner to produce steam; and
   generating power from the syngas.

25. A method of producing combined heat and power, the method comprising the steps of:
   providing a cupola comprising a feedstock inlet, an open chamber, and a metal bath, wherein the metal bath is disposed beneath the open chamber;
   delivering a feedstock to the cupola through the feedstock inlet which falls on the metal bath after passing through the open chamber;
   operating an inductive element to react with the metal bath to generate syngas from the feedstock, wherein the feedstock is delivered directly on top of the metal bath to generate the syngas;
   heating the syngas with a plasma torch after the syngas enters a syngas outlet;
   providing the syngas to a duct fired burner to produce steam; and
   generating power from the syngas.

26. A method of producing combined heat and power, the method comprising the steps of:
   providing a cupola comprising a feedstock inlet, an open chamber, and a metal bath, wherein the metal bath is disposed beneath the open chamber;
   delivering a feedstock to the cupola through the feedstock inlet which falls on the metal bath after passing through the open chamber;
   operating an inductive element to react with the metal bath to generate syngas from the feedstock, wherein the feedstock is delivered directly on top of the metal bath to generate the syngas;
   heating the syngas as the syngas exits the cupola;
   providing the syngas to a duct fired burner to produce steam; and
   generating power from the syngas.

* * * * *